(12) United States Patent
Hwang et al.

(10) Patent No.: US 7,898,298 B2
(45) Date of Patent: Mar. 1, 2011

(54) INVERTER DRIVER INTEGRATED CIRCUIT

(75) Inventors: Bo Hyun Hwang, Seoul (KR); Byoung Own Min, Gyunggi-Do (KR); Jeong In Cheon, Seoul (KR); Yun Jin Jang, Gyunggi-Do (KR); Seung Kon Kong, Gyunngi-Do (KR); Sang Cheol Shin, Gyunggi-Do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 0 days.

(21) Appl. No.: 12/437,713

(22) Filed: May 8, 2009

(65) Prior Publication Data

US 2010/0141300 A1  Jun. 10, 2010

(30) Foreign Application Priority Data

Dec. 8, 2008  (KR) ...................... 10-2008-0124116

(51) Int. Cl.
*H03K 19/20* (2006.01)
(52) U.S. Cl. ........................... 326/104; 326/82; 327/57; 315/225; 315/308
(58) Field of Classification Search ............. 326/81–83, 326/86–87, 104–105; 315/291, 307–308, 315/224, 226, DIG. 4, 209 R, 219, 246, 205–206, 315/248; 361/88, 89, 90, 91.1, 91.2, 91.3
See application file for complete search history.

(56) References Cited

U.S. PATENT DOCUMENTS

| | | | | |
|---|---|---|---|---|
| 6,008,590 | A * | 12/1999 | Giannopoulos et al. | . 315/209 R |
| 6,211,623 | B1 * | 4/2001 | Wilhelm et al. | ............. 315/224 |
| 7,545,369 | B1 * | 6/2009 | Lan et al. | ..................... 345/204 |
| 7,560,879 | B2 * | 7/2009 | Chen | .......................... 315/308 |
| 2007/0103096 | A1 | 5/2007 | Ren et al. | |

FOREIGN PATENT DOCUMENTS

JP  2004-071581 A  3/2004

\* cited by examiner

*Primary Examiner*—James H. Cho
*Assistant Examiner*—Christopher Lo
(74) *Attorney, Agent, or Firm*—Lowe, Hauptman, Ham & Berner, LLP

(57) ABSTRACT

An inverter driver integrated circuit (IC) includes a control signal generator generating a first control signal and a second control signal by use of a pulse width modulation oscillator signal, a comparator comparing a half-wave rectified signal of a lamp feedback signal fed back from a lamp with a preset reference signal to output a lamp state signal, a first sensor receiving the lamp state signal and the second control signal to output a first sensing signal, and a second sensor receiving the first sensing signal and the first control signal to output a second sensing signal.

7 Claims, 4 Drawing Sheets

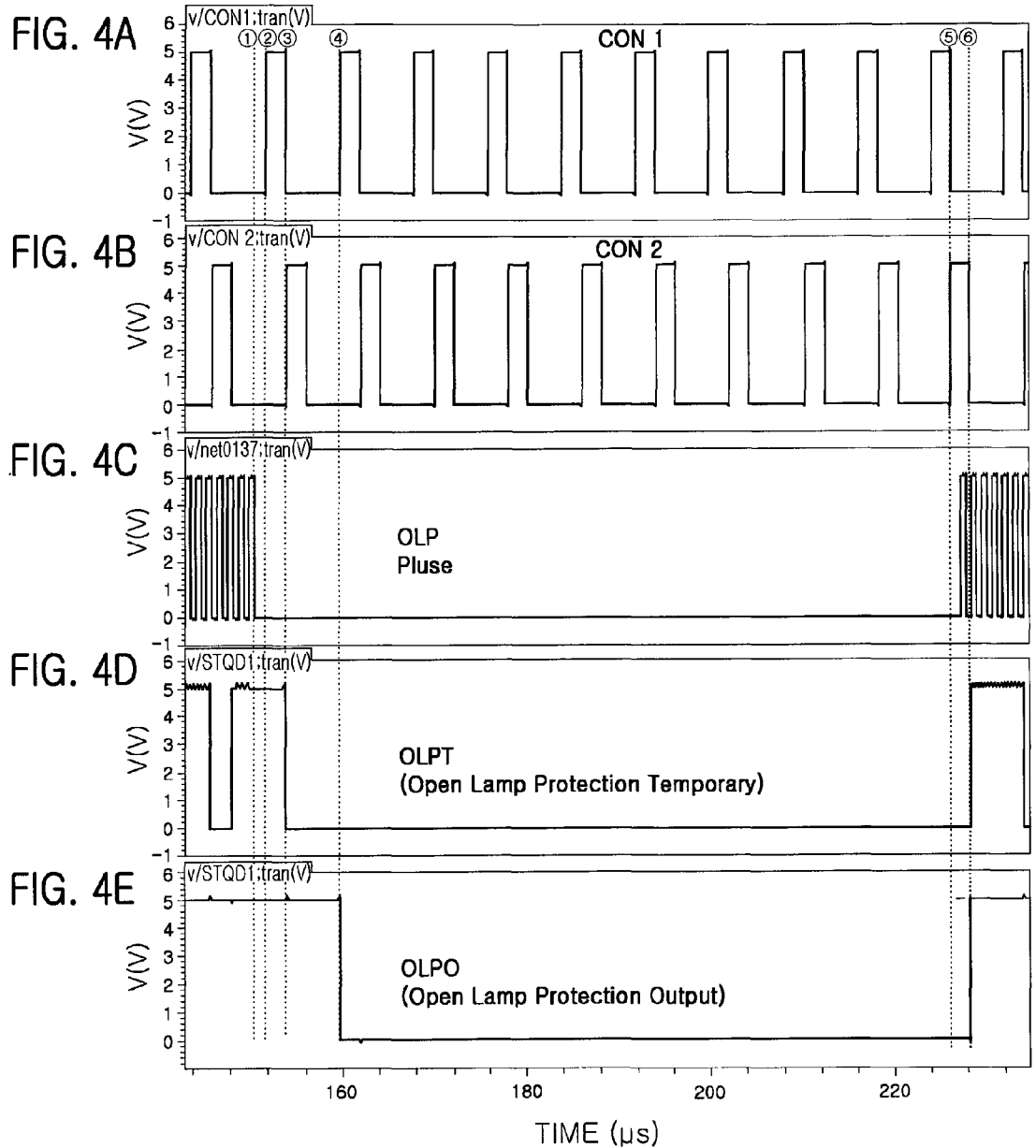

INVERTER DRIVER INTEGRATED CIRCUIT

CROSS-REFERENCE TO RELATED APPLICATIONS

This application claims the priority of Korean Patent Application No. 2008-0124116 filed on Dec. 8, 2008, in the Korean Intellectual Property Office, the disclosure of which is incorporated herein by reference.

BACKGROUND OF THE INVENTION

1. Field of the Invention

The present invention relates to an inverter driver integrated circuit, and more particularly, to an inverter driver integrated circuit including a sensor that can detect states, such as open lamps and overvoltage, by sensing a signal fed back from a lamp of a backlight unit.

2. Description of the Related Art

A plurality of cold cathode fluorescent lamps (CCFL) or light emitting diodes (LED) may be driven in parallel as lamps that ensure uniformity in the luminance of backlight units (BLUs) in display devices such as liquid crystal display (LCD) TVs.

In CCFLs, a fluorescent material is applied to the inner wall of a glass tube, electrodes are attached to both ends of the glass tube, and the glass tube is filled with a mixture gas having a pressure of tens of Torr and a predetermined amount of mercury. Such CCFLs are utilized in the lighting devices of LCD BLUs and the like because of their high luminance, high color rendering properties, low power consumption, and long useful life.

If any one of a plurality of lamps connected in parallel to each other is turned on before others, the resistance of the turned-on lamp may act like equivalent parallel resistance. In this case, a sufficient operating voltage is not applied to other lamps that are not turned on, so that those lamps remain turned off. Also, variations in overcurrent between lamps can cause a luminance imbalance. Therefore, it is considered important for BLU inverter driver integrated circuits to have protection circuit functions such as overvoltage protection (OVP), limited current circuit (LCC) and open lamp protection (OLP).

The demand for new concept one-chip inverter driver integrated circuits has arisen to achieve a reduction in the size of related art BLU inverters and to enhance cost competitiveness by minimizing the number of external components.

SUMMARY OF THE INVENTION

An aspect of the present invention provides an inverter driver integrated circuit that integrates therein external components serving to sense a feedback signal for the protection of a device in a BLU inverter, which drives multiple lamps.

According to an aspect of the present invention, there is provided an inverter driver integrated circuit (IC) including: a control signal generator generating a first control signal and a second control signal by use of a pulse width modulation oscillator signal; a comparator comparing a half-wave rectified signal of a lamp feedback signal fed back from a lamp with a preset reference signal to output a lamp state signal; a first sensor receiving the lamp state signal and the second control signal to output a first sensing signal; and a second sensor receiving the first sensing signal and the first control signal to output a second sensing signal.

The first control signal and the second control signal may have pulse signals which are identical in period and are high in different time bands within one period.

The control signal generator may include: a first flip-flop receiving the pulse width modulation oscillator signal as a clock signal; a second flip-flop receiving the pulse width modulation oscillator signal as a clock signal, and an output signal of the first flip-flop; a NOT gate feeding back an output signal of the second flip-flop as an input of the first flip-flop; a first AND gate performing an AND operation on the output signal of the first flip-flop and an inverted signal of the output signal of the second flip-flop to output a first control signal; and a second AND gate performing an AND operation on the output signal of the first flip-flop and the output signal of the second flip-flop to output a second control signal.

The first sensor may include: an SR latch circuit receiving the second control signal as a reset input thereof; and an AND gate performing an AND operation on an inverted signal of the second control signal and an output signal of the comparator to output a signal obtained by the AND operation as a set input of the SR latch circuit.

The second sensor may include: an SR latch circuit receiving an output signal of the first sensor as a set input thereof; and an AND gate performing an AND operation on an inverted signal of the output signal of the first sensor and the first control signal to output a signal obtained by the AND operation as a reset input of the SR latch circuit.

BRIEF DESCRIPTION OF THE DRAWINGS

The above and other aspects, features and other advantages of the present invention will be more clearly understood from the following detailed description taken in conjunction with the accompanying drawings, in which:

FIGS. 4A through 4E are graphs showing a first control signal, a second control signal, an output signal of a comparator, an output signal of a first sensor, and an output signal of a second sensor in the inverter driver integrated circuit of FIG. 1.

DETAILED DESCRIPTION OF THE PREFERRED EMBODIMENT

Exemplary embodiments of the present invention will now be described in detail with reference to the accompanying drawings.

Figure 1:
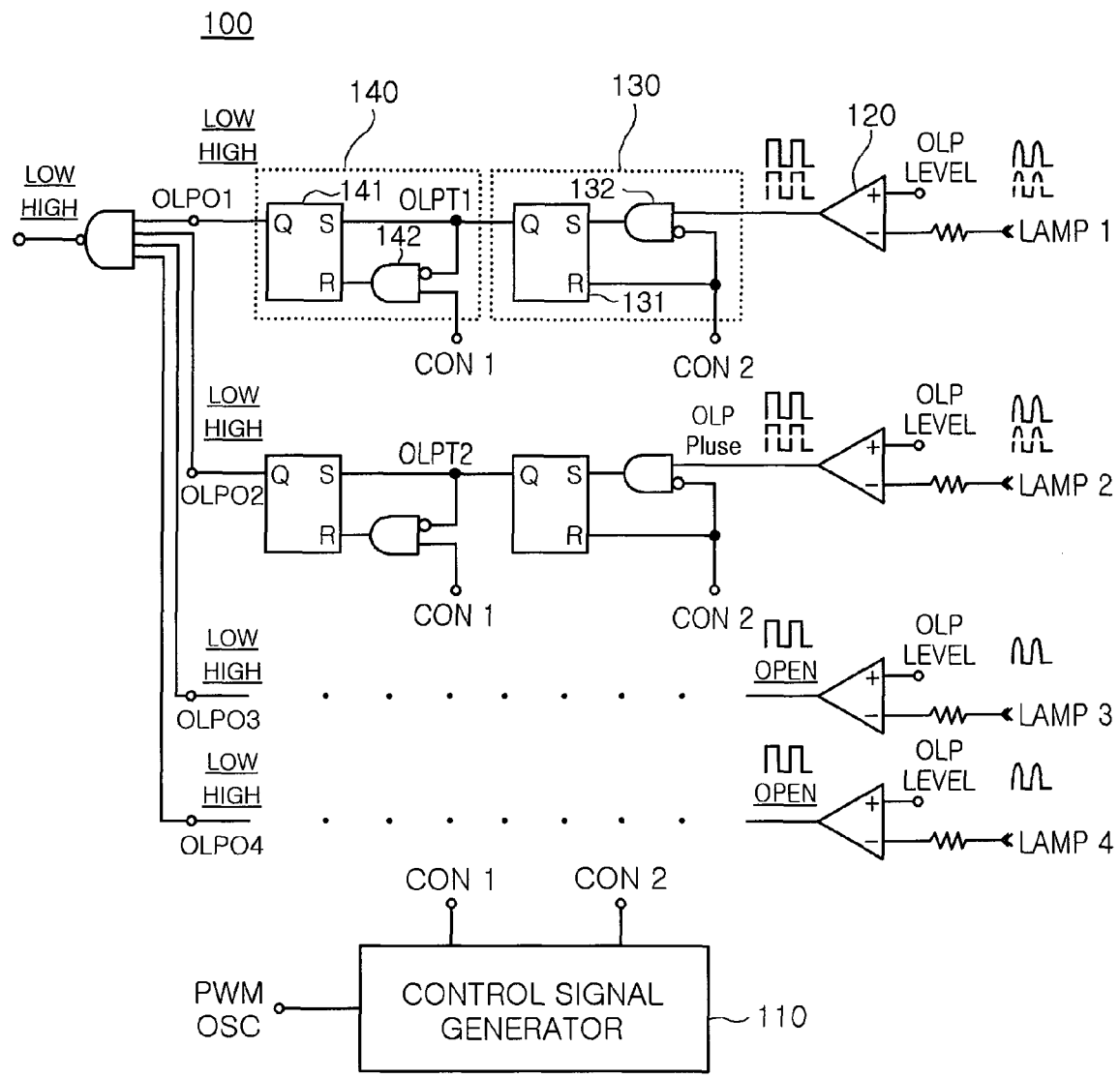
FIG. 1 is a circuit diagram of an inverter driver integrated circuit according to an exemplary embodiment of the present invention.

FIG. 1 is a circuit diagram of an inverter driver integrated circuit (IC) according to an exemplary embodiment of the present invention.

Referring to FIG. 1, an inverter driver IC 100 according to this embodiment may include a control signal generator 110, a comparator 120, a first sensor 130, and a second sensor 140.

The inverter driver IC 100 according to this embodiment may include a plurality of sensing circuits that are connected to a plurality of lamps used for an LCD backlight unit and sensing signals fed back from the lamps to detect the states of the lamps.

The inverter driver IC 100 may control a driving signal of the plurality of lamps by the use of a NAND gate 101 performing a NAND operation on signals OLPO1, OLPO2, OLPO3 and OLPO4 indicating the detected states of the plurality of lamps, such as open lamps, overvoltage and the like.

For ease of description, a sensing circuit that detects a lamp state based on a signal fed back from one of the plurality of lamps will be described as an example.

The control signal generator 110 may generate a first control signal CON1 and a second control signal CON2, using signals of a pulse width modulation oscillator PWM OSC (hereinafter, also referred to as pulse width modulation oscillator signals), which is configured inside the inverter driver IC 100.

A signal input to the control signal generator 110 may be a pulse width modulation signal with an on/off duty ratio adjusted with reference to a reference clock output from a pulse width modulation oscillator PWM OSC so as to have a predetermined period. The control signal generator 110 may generate a first control signal CON1 and a second control signal CON2, which are pulse signals which are identical in period and have different active durations in the same period. The detailed configuration of the control signal generator 110 will be described with reference to FIG. 2.

The comparator 120 compares a half-wave rectified signal of a signal fed back from a lamp (hereinafter, also referred to as lamp feedback signal) with a preset reference signal. The half-wave rectified signal of the lamp feedback signal may be obtained by simply using a circuit including a diode and a resistor. This circuit may be realized inside or outside the inverter driver IC. The lamp may be a cold cathode fluorescent lamp (CCFL) or a light emitting diode (LED).

The lamp feedback signal may indicate the state of the lamp. For example, the lamp feedback signal may be an AC signal if the lamp is in normal operation, or may be zero if the lamp is open.

A lamp state signal output from the comparator 120 may indicate the state of the lamp. That is, according to this embodiment, if a normal AC signal is fed back from the lamp and input to the comparator 120, the comparator 120 may output a pulse signal. If the lamp feedback signal input to the comparator 120 is zero, the lamp state signal output from the comparator 120 may be at a low level.

The first sensor 130 may output a first sensing signal OLPT1 upon the reception of the lamp state signal output from the comparator 120, and the second control signal CON2.

The first sensor 130 may include an SR latch circuit 131 receiving the second control signal CON2 as a reset (R) input, and an AND gate 132 performing an AND operation on the inverted signal of the second control signal CON2 and the output signal of the comparator 120 to output a signal, which results from the AND operation, as a set (S) input of the SR latch circuit 131.

If the S input is high, the SR latch circuit 131 may output a high signal until a high signal is input as the R input. Accordingly, in this embodiment, if a high signal from the AND gate 132 is input as the S input of the SR latch circuit, the SR latch circuit 131 may output a high signal until the second control signal CON2 is pulsed high.

The second sensor 140 may output a second sensing signal OLPO1 upon the reception of the first sensing signal OLPT1 and the first control signal CON1.

The second sensor 140 may include an SR latch circuit 141 receiving an output signal of the first sensor 130 as an S input thereof, and an AND gate 142 performing an AND operation on the inverted signal of the output signal of the first sensor 130 and the first control signal CON1 to output a signal, which results from the AND operation, as an R input of the SR latch circuit 141.

If the first sensing signal OLPT1 is high, the SR latch circuit 141 may output a high signal due to the characteristics thereof until the output signal of the AND gate 142 is pulsed high.

All of the control signal generator 110, the comparator 120, the first sensor 130 and the second sensor 140 may be realized, mounted inside the inverter driver IC. Accordingly, the inverter driver IC, according to this embodiment, can contribute to the miniaturization of inverters since functional units for sensing open lamps or the like may be mounted therein, as compared to the related art in which those functional units are implemented using separate external devices.

Figure 2:
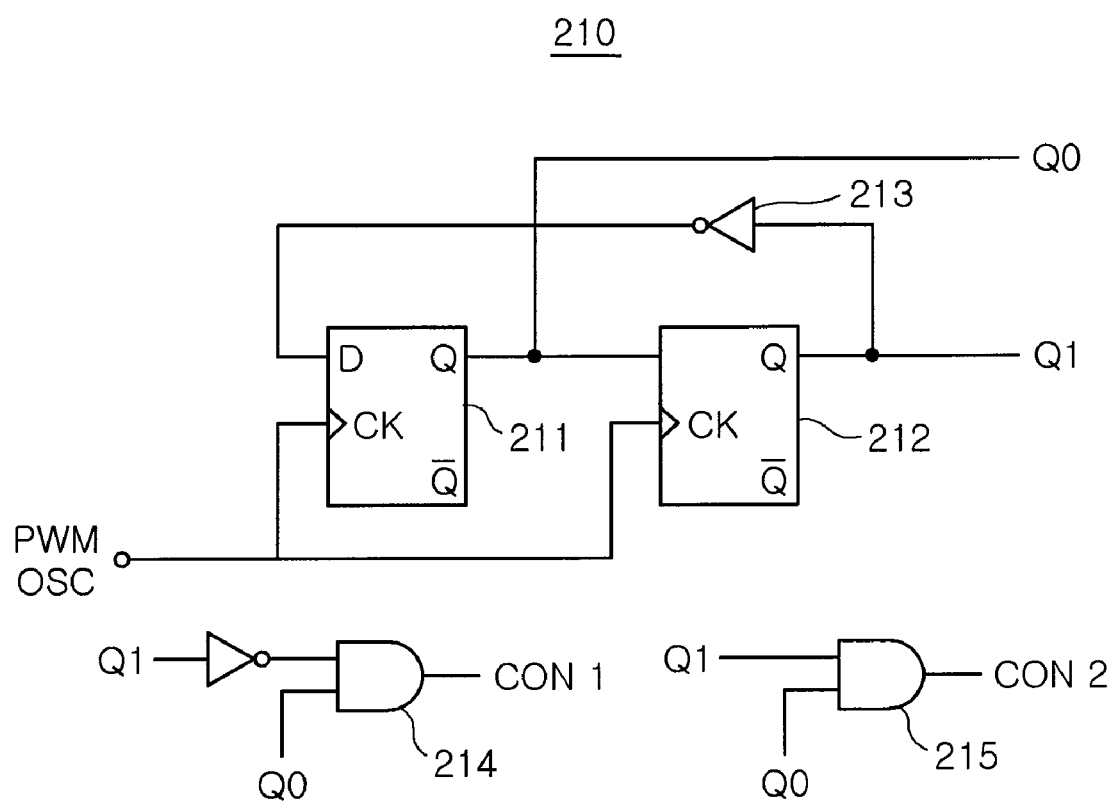
FIG. 2 is a circuit diagram of a control signal generator used in an inverter driver integrated circuit, according to an exemplary embodiment of the present invention.

FIG. 2 is a diagram showing a control signal generator in an inverter driver IC, according to an exemplary embodiment of the present invention.

Referring to FIG. 2, a control signal generator 210 according to this embodiment may include a first flip-flop 211, a second flip-flop 212, and a plurality of logic gates 213, 214 and 215.

A signal of a pulse width modulation oscillator PWM OSC may be input as a clock signal to the first flip-flop 211. The pulse width modulation oscillator signal may be a pulse signal having a predetermined period.

The pulse width modulation oscillator signal may be input as a clock signal to the second flip-flop 212. The output signal of the first flip-flop 211 may be input to the second flip-flop 212.

The output signal of the second flip-flop 212 may be fed back as the input of the first-flop 211 through a NOT gate 213.

Due to the aforementioned connection between the first flip-flop 211 and the second flip-flop 212 of this embodiment, an output signal Q0 of the first flip-flop 211 and an output signal Q1 of the second flip-flop 212 may have a temporal difference by one period of the pulse width modulation oscillator signal.

A first AND gate 214 may output a first control signal CON1 by performing an AND operation on the output signal Q0 of the first flip-flop 211 and the inverted signal of the output signal Q1 of the second flip-flop 212.

A second AND gate 215 may output a second control signal CON2 by performing an AND operation on the output signal Q0 of the first flip-flop 211 and the output signal Q1 of the second flip-flop 212.

According to this embodiment, the first control signal CON1 and the second control signal CON2 may be pulse signals that are identical in period and are high in different time bands within the same period.

FIGS. 3A through 3E are graphs showing the pulse width modulation oscillator signal, the output signal of the first flip-flop, the output signal of the second flip-flop, the first control signal and the second control signal in the control signal generator of FIG. 2, respectively.

A description will now be made with reference to FIGS. 2 and 3A through 3E.

Figure 3A:
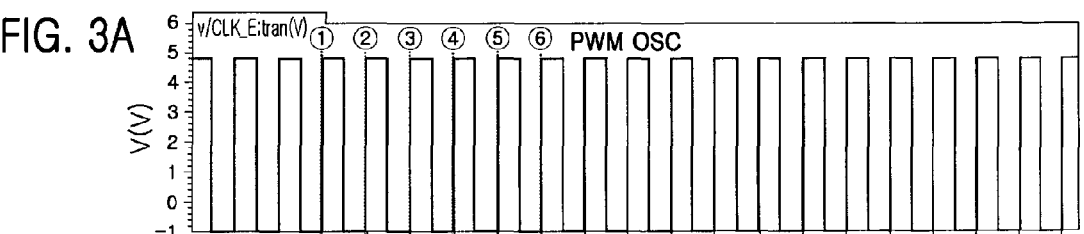
FIGS. 3A through 3E are graphs showing a pulse width modulation oscillator signal, an output signal of a first flip-flop, an output signal of a second flip-flop, a first control signal and a second control signal in the control signal generator of FIG. 2, respectively.

Referring to FIG. 3A, the pulse width modulation oscillator signal (PWM OSC) is a pulse signal which has a period (①~②) of 2 μs and is high for 1 μs in one period.

Figure 3B:
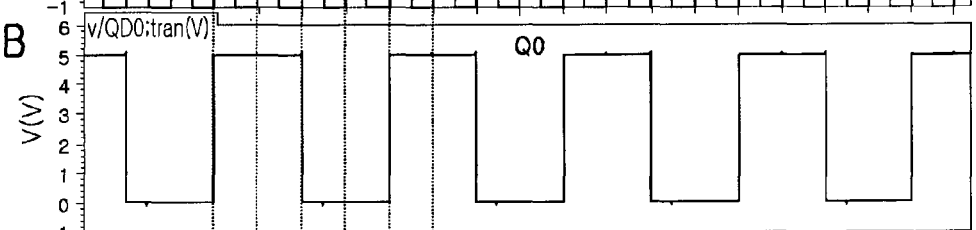

FIG. 3B shows an output signal Q0 output after the pulse width modulation oscillator signal has passed through the first flip-flop 211. The output signal Q0 of the first flip-flop

Figure 3C:
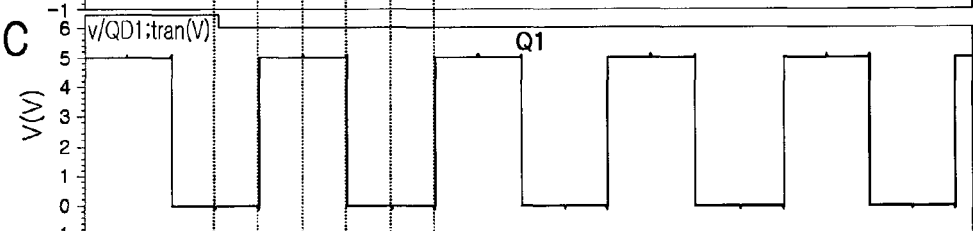

211 is a pulse signal which has a period ((①-⑤)) of 8 μs and is high ((①-③)) for 4 μs in one period FIG. 3C shows an output signal Q1 output after the pulse width modulation oscillator signal has passed through the second flip-flop 212. The output signal Q1 of the second flip-flop 212 is a pulse signal which has a period ((①-⑤)) of 8 μs and is high ((②-④)) for 4 μs in one period. According to this embodiment, the output signal Q1 of the second flip-flop 212 is a signal delayed from the output signal Q0 of the first flip-flop 211 by one period of the pulse width modulation oscillator signal.

Figure 3D:
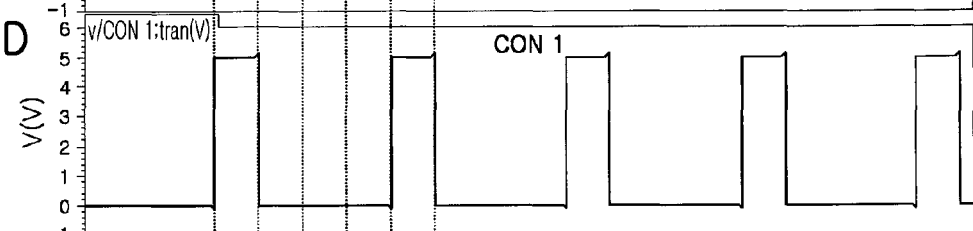

FIG. 3D shows a first control signal CON1 output as a result of the AND operation of the AND gate 214 on the output signal Q0 of the first flip-flop 211 and the inverted signal of the output signal Q1 of the second flip-flop 212. The first control signal CON1 is a pulse signal which has a period ((①-⑤)) of 8 μsa and is high ((①-②)) for 2 μs in one period.

Figure 3E:
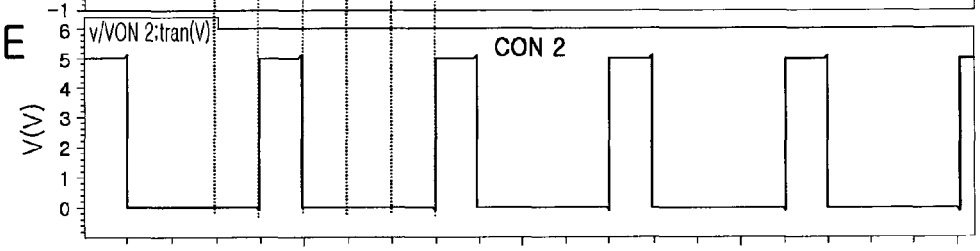

FIG. 3E shows a second control signal CON2 output as a result of the AND operation of the AND gate 215 on the output signal Q0 of the first flip-flop 211 and the output signal Q1 of the second flip-flop 212. The second control signal CON2 is a pulse signal which has a period ((①-⑤)) of 8 μs and is high ((②-③)) for 2 μs in one period.

According to this embodiment, the first control signal CON1 and the second control signal CON2 may be pulse signals which are identical in period and are high in different time bands within the same period.

FIGS. 4A through 4E show the first control signal, the second control signal, the output signal of the comparator, the output signal of the first sensor, and the output signal of the second sensor in the inverter driver IC of FIG. 1, respectively. Hereinafter, a description will be made with reference to FIGS. 1 and 4A through 4E.

FIG. 4A shows a first control signal CON1 applied to the second sensor 140. The first control signal CON1 is a pulse signal having a period ((②-④)) of 8 μs and is high ((②-③)) for 2 μs in one period.

FIG. 4B shows a second control signal CON2 applied to the first sensor 130. The second control signal CON2 is a pulse signal which has a period ((②-④)) of 8 μs and is high for 2 μs in one period.

FIG. 4C shows a lamp state signal input to the first sensor 130 via the comparator 120. According to this embodiment, the lamp state signal is input as a pulse signal until the time point of 150 μs ((①)) since the lamp is in normal operation, and then is input as a zero signal until a predetermined time point (in between ⑤ and ⑥) since the lamp is open. After the predetermined time point, the lamp resumes normal operations and thus the lamp state signal is input as a pulse signal.

FIG. 4D shows a signal output from the first sensor 130 upon the reception of the lamp state signal of FIG. 4C and the second control signal of FIG. 4B.

In the first sensor 130, a signal, resulting from the AND operation of the AND gate 132 on the output signal of the comparator 120 and the inverted signal of the second control signal CON2, is input as the S input of the SR latch circuit 131, and the second control signal CON2 is input as the S input of the SR latch circuit 131. Thus, the first sensor 130 may output a first sensing signal OLPT.

In the case that the output signal of the comparator 120 is a normal pulse signal since the lamp is in normal operation, the first sensing signal OLPT may be pulsed low if the second control signal CON2 is high, and the first sensing signal OLPT may be pulsed high if the second control signal CON2 is low.

In the case that the output signal of the comparator 120 is low ((①)) since the lamp is open, the first sensing signal OLPT may be pulsed low when the second control signal CON2 is pulsed high. Thereafter, if the output signal of the comparator 120 becomes a normal pulse signal ((⑤)), the falling time ((⑥)) of the second control signal CON2 may correspond to the rising time of the first sensing signal OLPT.

FIG. 4E shows a signal output from the second sensor 140 upon the reception of the output signal OLPT of the first sensor of FIG. 4D and the first control signal of FIG. 4A.

In the second sensor 140, a signal, resulting from the AND operation of the AND gate 142 on the inverted signal of the output signal OLPT of the first sensor 130 and the first control signal CON1, is input as the R input of the SR latch circuit 141, and the output signal OLPT of the first sensor 130 is input as the S input of the SR latch circuit 141. Accordingly, the second sensor 140 may output a second sensing signal OLPO.

If the first sensing signal OLPT is input at a high level, the second sensing signal OLPO may be held high unless the first sensing signal OLPT is pulsed low and the first control signal CON1 is pulsed high.

In the case that the first sensing signal OLPT is kept low, the second sensing signal OLPO is kept low if the first control signal CON1 is pulsed high ((④)).

At the time ((⑥)) when the first sensing signal OLPT is pulsed high again, the second sensing signal OLPT may also be pulsed high.

From the graph of FIG. 4C of the lamp state signal input to the first sensor 130 via the comparator 120 and the graph of FIG. 4E of the signal output from the second sensor 140, it can be seen that the output signal OLPO of the second sensor 140 can be held high if the lamp state signal is input in the form of pulse waves due to the normal operation of the lamp.

Even when the lamp state signal is forced to zero ((①)) as the lamp becomes open, the signal output from the second sensor 140 may be kept high for a predetermined time ((①-④)). The time for which the second sensor 140 is kept high may correspond to a single period of the first control signal CON1. The time corresponding to the single period of the first control signal CON 1 may correspond to four periods of the pulse width modulation oscillator signal. Thus, according to this embodiment, the lamp may operate normally for a predetermined time even in the case of the abnormal operation of the lamp. If the abnormal operation of the lamp is sensed even after the predetermined time, then the second sensing signal OLPO may be forced low. The inverter driver IC according to this embodiment may be realized so as to prevent a lamp from being shut down when the lamp operates abnormally momentarily and then returns to its normal operation. Accordingly, the inverter driver IC according to this embodiment can reduce unnecessary power consumption and increase the useful life of the lamp.

If the lamp is recovered from its abnormal state and operates normally, the second sensing signal OLPO may return to high in a relatively short time since the falling time of the second control signal CON2 corresponds to the rising time of the second sensing signal OLPO.

As set forth above, according to exemplary embodiments of the invention, the inverter driver IC can achieve a reduction in the size of an inverter and enhance cost competitiveness, since the number of external components of the inverter is minimized by mounting functional units for sensing feedback signals of the lamps inside the inverter driver IC, as compared to a related art inverter driver IC where the functional units are implemented outside the related art inverter driver IC.

While the present invention has been shown and described in connection with the exemplary embodiments, it will be apparent to those skilled in the art that modifications and variations can be made without departing from the spirit and scope of the invention as defined by the appended claims.

What is claimed is:

1. An inverter driver integrated circuit (IC) comprising:
a control signal generator for generating a first control signal and a second control signal by use of a pulse width modulation oscillator signal;
a comparator for comparing a half-wave rectified signal of a lamp feedback signal fed back from a lamp with a preset reference signal to output a lamp state signal;
a first sensor for receiving the lamp state signal and the second control signal to output a first sensing signal; and
a second sensor for receiving the first sensing signal and the first control signal to output a second sensing signal;
wherein the control signal generator comprises:
a first flip-flop for receiving the pulse width modulation oscillator signal as a clock signal;
a second flip-flop for receiving the pulse width modulation oscillator signal as a clock signal, and an output signal of the first flip-flop;
a NOT gate for feeding back an output signal of the second flip-flop as an input of the first flip-flop;
a first AND gate performing an AND operation on the output signal of the first flip-flop and an inverted signal of the output signal of the second flip-flop to output a first control signal; and
a second AND gate performing an AND operation on the output signal of the first flip-flop and the output signal of the second flip-flop to output a second control signal.

2. An inverter driver integrated circuit (IC) comprising:
a control signal generator for generating a first control signal and a second control signal by use of a pulse width modulation oscillator signal;
a comparator for comparing a half-wave rectified signal of a lamp feedback signal fed back from a lamp with a preset reference signal to output a lamp state signal;
a first sensor for receiving the lamp state signal and the second control signal to output a first sensing signal; and
a second sensor for receiving the first sensing signal and the first control signal to output a second sensing signal;
wherein the first sensor comprises:
an SR latch circuit for receiving the second control signal as a reset input thereof; and
an AND gate performing an AND operation on an inverted signal of the second control signal and an output signal of the comparator to output a signal obtained by the AND operation as a set input of the SR latch circuit.

3. An inverter driver integrated circuit (IC) comprising:
a control signal generator for generating a first control signal and a second control signal by use of a pulse width modulation oscillator signal;
a comparator for comparing a half-wave rectified signal of a lamp feedback signal fed back from a lamp with a preset reference signal to output a lamp state signal;
a first sensor for receiving the lamp state signal and the second control signal to output a first sensing signal; and
a second sensor for receiving the first sensing signal and the first control signal to output a second sensing signal;
wherein the second sensor comprises:
an SR latch circuit for receiving an output signal of the first sensor as a set input thereof; and
an AND gate performing an AND operation on an inverted signal of the output signal of the first sensor and the first control signal to output a signal obtained by the AND operation as a reset input of the SR latch circuit.

4. The inverter driver IC of claim 1, wherein the first sensor comprises:
an SR latch circuit for receiving the second control signal as a reset input thereof; and
an AND gate performing an AND operation on an inverted signal of the second control signal and an output signal of the comparator to output a signal obtained by the AND operation as a set input of the SR latch circuit.

5. The inverter driver IC of claim 4, wherein the second sensor comprises:
an SR latch circuit for receiving an output signal of the first sensor as a set input thereof; and
an AND gate performing an AND operation on an inverted signal of the output signal of the first sensor and the first control signal to output a signal obtained by the AND operation as a reset input of the SR latch circuit.

6. The inverter driver IC of claim 1, wherein the second sensor comprises:
an SR latch circuit for receiving an output signal of the first sensor as a set input thereof; and
an AND gate performing an AND operation on an inverted signal of the output signal of the first sensor and the first control signal to output a signal obtained by the AND operation as a reset input of the SR latch circuit.

7. The inverter driver IC of claim 2, wherein the second sensor comprises:
an SR latch circuit for receiving an output signal of the first sensor as a set input thereof; and
an AND gate performing an AND operation on an inverted signal of the output signal of the first sensor and the first control signal to output a signal obtained by the AND operation as a reset input of the SR latch circuit.

* * * * *